United States Patent [19]
Gardner et al.

[11] 3,910,046
[45] Oct. 7, 1975

[54] TWO STAGE SERVOMOTOR

[75] Inventors: Delbert J. Gardner; William C. Sisco; Frederick G. Grabb; Carl D. Owens, all of South Bend, Ind.

[73] Assignee: The Bendix Corporation, South Bend, Ind.

[22] Filed: Oct. 2, 1974

[21] Appl. No.: 511,413

[52] U.S. Cl. .................. 60/553; 60/572; 60/592; 60/584; 91/434
[51] Int. Cl.² ........................................ F15B 7/00
[58] Field of Search .......... 60/553, 556, 572, 574, 60/575, 576, 592; 188/347; 91/387, 391 R, 434

[56] References Cited
UNITED STATES PATENTS

| | | | |
|---|---|---|---|
| 3,155,012 | 11/1964 | Ayers, Jr. ........................... | 91/434 X |
| 3,517,970 | 6/1970 | Cripe ................................. | 60/574 X |
| 3,685,289 | 8/1972 | Kobashi et al. .................... | 60/592 X |
| 3,760,587 | 9/1973 | Ingram .............................. | 60/575 |

*Primary Examiner*—Martin P. Schwadron
*Assistant Examiner*—H. Burks, Sr.
*Attorney, Agent, or Firm*—Leo H. McCormick, Jr.; William N. Antonis

[57] ABSTRACT

A pressure differential controlled valve for use in a two stage servomotor to delay the communication between a second pressurizing chamber and a first pressurizing chamber until compensatory fluid, which is lost from the first pressurizing chamber in the transfer of the development of an operational force from a first diameter on a power piston to a second diameter on the power piston is replaced.

10 Claims, 2 Drawing Figures

TWO STAGE SERVOMOTOR

BACKGROUND OF THE INVENTION

In copending U.S. application Ser. No. 481,433 incorporated herein by reference, it is disclosed how a stepped diameter piston can sequentially produce a first pressure force and a second pressure force when a transfer control valve is operated by movement of a plunger connected to an input push rod. The input push rod transfers an output force created by the development of a pressure differential across a wall. The stepped diameter piston is connected to the wall. When the transfer control valve is activated, the output force is shifted to the second diameter to produce an added output potential. However, in the event that the pressure differential across the wall does not develop, the transfer control valve directly shifts the input force from the first diameter to the second diameter completely eliminating the development of the first pressure force.

Later in copending U.S. application Ser. No. 484,381, incorporated herein by reference, a hold off means is disclosed for delaying the development of the second pressure force until the first pressure force reaches a predetermined value when the transfer control valve is operated by the input force. In this servomotor means, a stepped piston means divides the pressurizing chamber of the pressurizing mechanism into a first section and a second section. The first section is connected to a relief chamber through the transfer control valve. The relief chamber is connected to a reservoir through a flow path. A tilt valve means located in the flow path allows communication of fluid from the reservoir when a stem therefrom engages the stepped piston and prevents communication of fluid from the relief chamber when the stepped piston disengages the stem. As the stepped piston moves in response to the input force, the first diameter transfers fluid from the first section through the transfer control valve into the relief chamber. The hold off means prevents any fluid from escaping from the relief chamber until the first pressure force reaches a predetermined value. This same first pressure force is simultaneously supplied to the wheel brakes. When the first pressure force reaches the predetermined value, the hold off means releases fluid to the reservoir and permits the input force to act through that portion to provide an added output as a second pressure force for operating the wheel brakes. However, if the transfer valve is rapidly modulated, fluid from the second section will be transferred to the first section when the valve is released and afterwards released into the reservoir. This reduction in fluid from the brake system will allow the stepped piston means to contact the bottom of the bore in the second section before the optimum second pressure force is developed.

SUMMARY OF THE INVENTION

We have devised a pressure differential controlled first valve means actuated by the movement of a transfer valve means in response to an input force. The transfer valve means shifts the operational output production by sequentially engaging the first valve means to interrupt communication between a large diameter chamber containing a piston means and a smaller diameter chamber containing a piston means while permitting a regulated release of fluid from the large diameter to a relief reservoir to allow a piston means to move in the smaller diameter and produce an output therefrom. A first pressure differential is created across the first valve means as the pressure in the smaller diameter chamber increases and that in the larger diameter chamber decreases. With a decrease in the input force, this first pressure differential will cause the first valve means to follow the movement of the transfer valve means toward the release position. Since a volume of fluid in the first diameter chamber has been released to the relief chamber, a second pressure differential will be created between the first diameter chanber and a source of fluid in a reservoir. The fluid in the reservoir will overcome a check valve means and flow into the first diameter chamber to substantially replace that volume of fluid transmitted to the relief chamber and eliminate this second pressure differential. At the same time the first pressure differntial will be reduced sufficiently to allow a resilient means to move the first valve means away from the transfer valve means and re-establish communication between the large diameter chamber and the smaller diameter chamber to return the operation of the servomotor to the large diameter chamber.

It is therefore the object of this invention to provide a two stage servomotor with a control means for preventing communication between a first pressurizing chamber and a second pressurizing chamber until compensatory fluid is communicated to the first pressurizing chamber to replace that fluid released in the establishment of a second mode of operation.

it is another object of this invention to provide a control means actuated by a transfer valve and released by the termination of a pressure differential to operate a two stage servomotor.

It is a further object of this invention to provide a two stage servomotor with means for maintaining a substantially constant volume of operational fluid within the system operated by the two stage servomotor during modulation of the operational valve.

It is a still further object of this invention to provide a two stage servomotor with a pressure differential controlled release valve for delaying the return of operational output generation from a second stage to a first stage until the volumetric level in the two stage servomotor is re-established to its initial position.

It is a still further object of this invention to provide a two stage servomotor having a piston associated with a transfer valve which allows fluid to be released from a first chamber to a reservoir to permit an input force to move the piston in a second chamber and a release valve means which prevents the transfer to fluid from the second chamber to the first chamber until compensatory fluid from the reservoir is added to replace that released during actuation of the transfer valve.

These and other objects will be apparent from reading this specification and viewing the drawing.

DETAILED DESCRIPTION OF THE PREFERRED EMBODIMENT

Figures 1, 2:
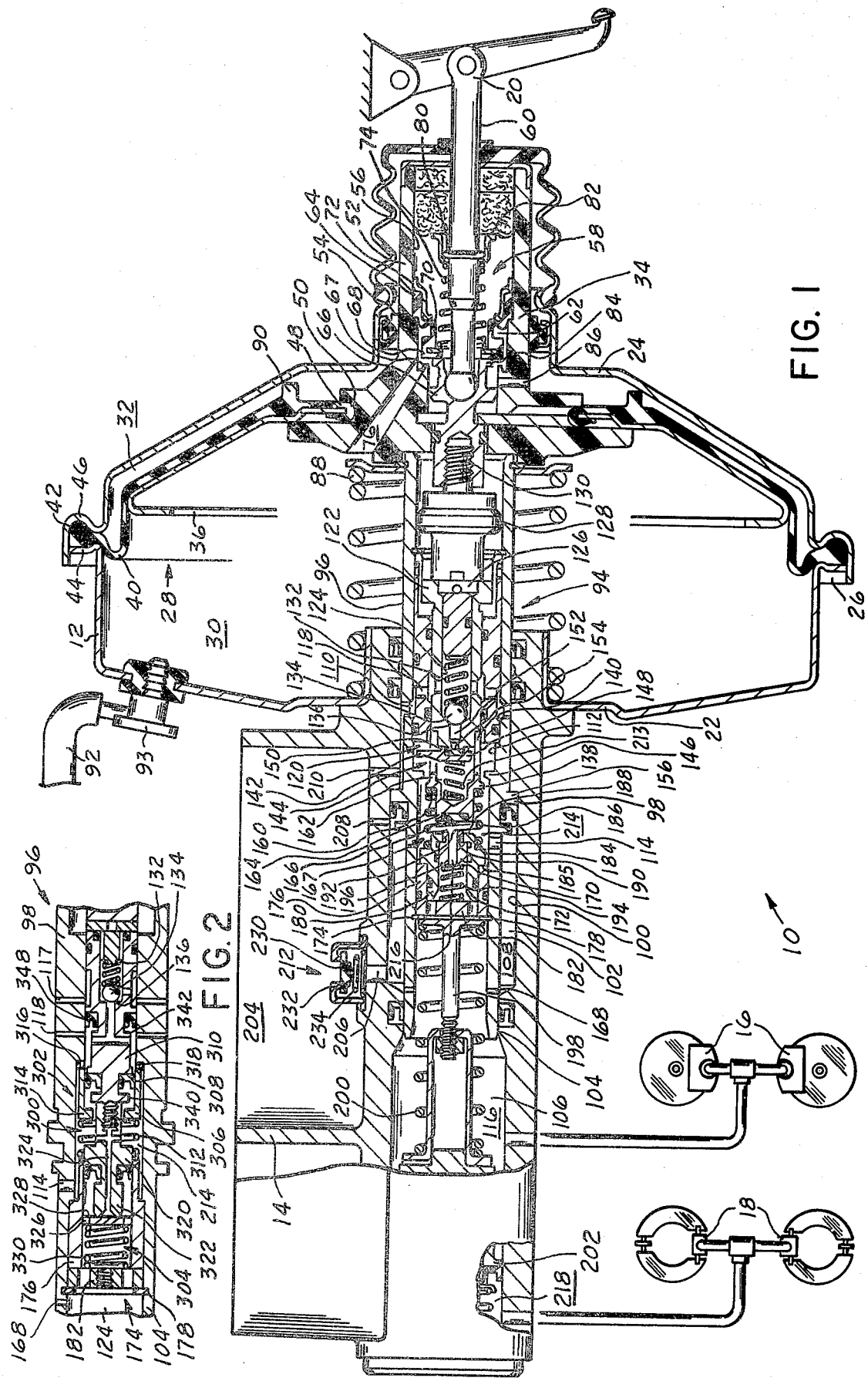
FIG. 1 is a schematic illustration of a power braking system with a sectional view of a two stage servomotor having a control means for preventing communication between a first pressurizing chamber and a second pressurizing chamber in the second stage until a pressure differential therebetween is substantially eliminated to allow a volume of fluid to be maintained in the first pressurizing chambers.
FIG. 2 is another embodiment of the control means of FIG. 1 having a one-way check valve for controlling the fluid flow between the first and second pressurizing chambers.

The braking system 10, shown in FIG. 1, has a fluid pressure servomotor 12 connected to a master cylinder 14 for supplying the front wheel brakes 16 and rear wheel brakes 18 with an operational hydraulic force in response to an input force applied to pedal 20 by an operator.

The fluid pressure servomotor 12 has a first shell 22 joined to a second shell 24 by a twist lock arrangement 26. A movable wall means 28 is located within the first shell 22 and the second shell 24 to form a first variable volume chamber 30 and a second variable volume chamber 32. The wall means 28 has a central hub 34 with a backing plate 36 extending therefrom. A diaphragm 40 has a first bead 42 on its periphery which is held between flange 44 and flange 46 on the first shell 22 and the second shell 24, respectively, and a second bead 48 which is snapped onto groove 50 adjacent the backing plate 36.

The hub 34 has a rearwardly extending projection 52 which extends through opening 54 in the first shell 22. The projection 52 has an axial bore 56 into which a control valve means 58 is located for supplying an operational input from pedal 20 through push rod 60.

The control valve means 58 has a poppet assembly 62 which is sequentially operated upon movement of plunger 66 by a push rod 60 to interrupt vacuum and allow air to develop a pressure differential across the wall means 28.

The poppet assembly 62 has a face 68 separated from a fixed bead 64 by a flexible section 70. The bead 64 is retained within bore 56 by a retainer 72 which biases the bead 64 against the projection 52. A first spring 74 connected to shoulder 80 on push rod 60 urges the face 68 toward a vacuum seat 67 adjacent vacuum passage 76. The vacuum passage 76 connects the first chamber 30 with the interior bore 56 of the hub means 34.

A return spring 88 located between the shell 22 and hub means 34 urges bumper 90 on diaphragm 40 toward shell 24. In this position, vacuum communicated from the intake manifold through conduit 92 past check valve 93 into the front chamber 30 will evacuate air from the second variable volume chamber 32 by way of passage 86 into bore 56 and out passage 76 to vacuum suspend the wall means 28.

A ratio changer means 94 has a cylindrical stepped piston means 96 which is attached to the hub means 34. The stepped piston 96 has a first diameter 98 located in a first diameter section 100 of bore 102 and a second diameter 104 located in a second diameter section 106 of the bore 102 of the master cylinder 14. The first diameter 98 of the piston means 96 divides the first diameter section 100 into a pressurizing chamber 108 and a relief chamber 110. An axial passage 112 which extends through the stepped piston means 96 has a first radial passage 114 which connects the pressurizing chamber 108 with an outlet chamber 116 and a second radial passage 118 which connects the pressurizing chamber 108 with the relief chamber 110.

A transfer valve means 120 is located within the axial passage between the first radial passage 114 and the second radial passage 118 for controlling the communication between the first pressurizing chamber 108 and the relief chamber 110. The transfer valve means 120 has a cylindrical section 122 with an axial bore 124 therethrough into which a plug 126 is located to prevent communication therefrom into the axial bore 112. The plug 126 has a guide 128 which aligns the transfer valve means 120 within the axial bore 112. The plug 126 has adjustable threads 130 for locating the transfer valve means 120 within the bore 112. A spring 132 located in the bore 124 urges poppet means 134 toward a seat 136 to establish a minimum hydraulic pressure level which will provide communication between the first pressurizing chamber 108 and the relief chamber 110.

A tubular projection 138 which extends from the cylindrical body 122 has a slot 140 cut therethrough for permitting arm 142 of tilt valve means 144 to extend into the axial bore 112 and engage rib 146 upon movement of the transfer valve means 120. A shoulder 160 separates a first diameter 162 from a second diameter 164. A resilient disc 166 is located on the end of the second diameter 164.

The transfer valve means has a circular body 148 with an annular seat 150 which extends therefrom toward the opening 152 which connects the first pressurizing chamber 108 with the relief chamber 110. A resilient pad 154 which is located within the annular seat 150 is urged against the cylindrical body 122 by spring 156 to close opening 150.

A pressure differential valve means 167 is located within the axial bore 112 between the first radial passage 114 and a release passage 168 in the piston means 96. The pressure differential valve means 167 includes a first sleeve means 170 and a concentric second sleeve means 172 retained in the axial bore 112 by a stop means 174. An annular guide 176 extends from a snap ring 178 of the stop means 174 for aligning the first and second sleeve means 170 and 172 respectively within the axial bore 112. The second sleeve means 172 has a tapered end 180 which engages perforated end 182 and a shouldered end 184 which is held against the end 185 of guide 176 by spring or resilient means 186. The resilient means 186 provides a force sufficient to move the atmospheric seat 84 on the plunger 66 into contact with face 68 of the poppet means or assembly 62 to separate the rear chamber 32 from the atmosphere while returning the push rod 60 to its rest position. The second sleeve means 172 has a rib 188 which engages shoulder 190 on the first sleeve means 170 to hold seat 192 away from resilient disc 166 in opposition to spring 194 caged between end 196 and the perforated end 182 of guide 176. An adjustable output cage screw 198 is held against the snap ring 178 by a spring 200 through which an output force is transmitted to a secondary piston 202 in bore 106 which supplies the rear wheel brakes 18 with an operational output.

The first pressurizing chamber 108 is connected to the reservoir 204 by a first port 206 and a second port 208 while the relief chamber 110 is connected by a third port 210. A check valve means 212 is associated with the first port 206 to prevent fluid from flowing from the first pressurizing chamber 108 into the reservoir 204. The check valve includes a disc 230 held against a seat 232 by a spring 234.

MODE OF OPERATION OF THE PREFERRED EMBODIMENT

When an operator applies an input force to pedal 20, push rod 60 will move to allow spring 74 to move face 68 of the poppet assembly 62 against vacuum seat 67 to interrupt communication between the first chamber 30 and bore 56 through passage 76. Further movement of the push rod 60 will move the atmospheric seat 84 away from face 68 to allow air at atmospheric pressure in bore 56 to enter the rear chamber 32 through passage 86. With air in the rear chamber 32 and vacuum in the front chamber 30, a pressure differential will be created across the wall means 28. This pressure differential will create an operational force which will be transmitted through the hub means 34 to move the piston means 94 in bore 102 of the master cylinder 14. As the first diameter section 98 of the piston means 94 moves in the first diameter section 100 a first hydraulic pressure will develop in the pressurizing chamber 108 after the lip seal 213 has moved past the second port 208. This first hydraulic pressure will be communicated through passage 114 into control chamber 214, out axial bore 216 of the first sleeve 170 and into the outlet chamber 116 for communication to the wheel brakes 16. At the same time spring 200 and the fluid pressure in chamber 116 will move piston 202 to develop a corresponding hydraulic pressure in chamber 218 for operating the rear wheel brakes 18.

The first hydraulic pressure in the control chamber 214 will act on the cylindrical section 122 to balance the input force transmitted through the adjustable guide 128 of the plunger 66. As the operator increases the input force through the push rod 60, the pressure differential across wall means 28 will correspondingly increase until the rear chamber 32 is completely filled with air at atmospheric pressure, commonly referred to as "vacuum runout". Any further input from the operator will be transmitted from plunger 66 to move the cylindrical section 122. When sufficient movement has occurred to move resilient disc 166 onto seat 192, communication between the first pressurizing chamber 108 and the outlet chamber 116 will be interrupted. Further movement of the cylindrical section 122 will move arm 142 into contact with rib 146 causing the tilt valve means 144 to pivot on the annular seat 150 and allow fluid under pressure to overcome spring 132 and flow into the relief chamber 110. As the fluid under pressure is released from the first pressurizing chamber 108, the pressure differential acting on wall means 28 will be proportionally applied to move the second diameter 104 in the second section 106 to provide an increased or second stage hydraulic pressure in the outlet chamber 116 for operating the wheel brakes 16 and 18.

As the hydraulic pressure differential between the first pressurizing chamber 108 and the second pressurizing or outlet chamber 116 increases, spring 186 will transmit an indication to the operator of the intensity of the pressurization of the fluid in the outlet chamber 116. This hydraulic pressure differential will move the second sleeve 172 into contact with the end of the second diameter 164 of the tubular projection 138 to further seal the outlet chamber 116 from the first pressurizing chamber 108 and transmit a reaction force through the plunger means 66 to the push rod 60 to indicate to the operator the intensity of the braking force being produced.

With a reduction in the input force on pedal 20, arm 142 of tilt valve means 144 will move away from rib 146 to allow spring 156 to move resilient pad 154 over opening 152 to separate the first pressurizing chamber 108 from the relief chamber 110. Now as the first diameter section 100 moves in bore 102, a first release pressure differential will be created between the first pressurizing chamber 108 and the reservoir 204 and a second release pressure differential will be created between the first and second pressurizing chambers. This first release pressure differential will overcome spring 234 to allow fluid from the reservoir to enter the first pressurizing chamber 108 and replace that fluid which was transmitted through the relief chamber 110 during the pressure intensification mode of operation. The second pressure differential is proportionally reduced with a reduction in the input force on the pedal 20. When the second pressure differential reaches a predetermined value, spring 186 will move the second sleeve 170 on guide 176 to unseat seat 192 from the resilient pad 166 and allow communication between the first and second pressurizing chambers.

Upon termination of the input force on pedal 20, return spring 186 will move the atmospheric seat 84 against face 68 and face 68 away from the vacuum seat 67 to allow the vacuum present in chamber 30 to evacuate the rear chamber and again vacuum suspend the wall means 28. In this position, fluid in the second pressurizing chamber 116 can bypass the valve means 167 by flowing through radial opening 168 into the first pressurizing chamber 108. At the same time, reservoir 204 will be connected through part 208 to the first pressurizing chamber 108 for replenishing any fluid which may have been lost from the braking system during the previous braking sequence.

In the embodiment shown in FIG. 2, like parts are identified with the same numeral as in FIG. 1.

The first valve means or transfer valve means 300 located within the control chamber 214 has a relief valve means 302 and a pressure differential valve means 304 located within the axial bore 124.

The relief valve means 302 has a cylindrical section 306 which is carried by seal 308 on the plunger 310. A spring 312 located between guide 176 and shoulder 314 urges face 316 of the cylindrical section 306 against seat 318 to seal the first pressurizing chamber 108 from the relief chamber 110. The extension 320 of the plunger engages the guide 176 to align face 322 with the pressure differential valve means 304. The cross bored passage 324 connects the control chamber 214 with the axial bore 124.

The pressure differential valve means 304 has a disc 326 whose face 328 is urged against face 322 by spring 330 to prevent fluid from flowing from the second pressurizing chamber toward the first pressurizing chamber 108.

When the piston means 96 is operating in the first mode of operation, fluid under pressure is transmitted through cross bore 324 past disc 328 and into the outlet chamber 116. Upon reaching vacuum runout shoulder 340 on plunger 310 will engage shoulder 314 to move the relief valve 306 away from seat 318 to allow fluid to be communicated through the section 342 of the relief chamber 110 by way of passage 118. With a reduction in the input force on the plunger 310, the pressure differential between the second pressurizing chamber 116 and the first pressurizing chamber 108 will be correspondingly reduced since the second pressurizing chamber will be expanded by the removal of the second diameter 104 therefrom. As the second diameter 104 is removed from the second pressurizing chamber 116, a release pressure differential will be created in the first pressurizing chamber 108. This release pressure differential will overcome the check valve means 212 to allow fluid to enter from the reservoir and replenish the fluid lost through actuation of the relief valve means 302. Upon termination of the input force, the hydraulic fluid in the outlet chamber 116 will be released through passage 168 to eliminate the pressure differential across the valve means 304.

In the event of a slam application on the part of an operator, plunger 310 will move seal 348 past the relief port 118 to prevent fluid from the first pressurizing chamber from flowing into relief chamber 110 without at least a portion thereof being transmitted through the pressure differential valve means 304 into the outlet chamber. As the first diameter 100 moves in the first pressurizing chamber 108, on a slam application valve 302 will be opened, however, resiliently positioned ball or poppet 134 will prevent flow into the relief chamber through radial passage 117 until a predetermined pressure build-up has occurred. This enables the first pressurizing chamber 108 to deliver additional fluid to the brakes by way of axial bore 124 until the pressure in the outlet chamber 116 exceeds the pressure established by the spring 132 of the poppet 134.

We claim:

1. In a power braking system having a piston means moved by a wall means which responds to a valve means operated by an input force, said piston means producing a first fluid force in a first mode of operation and a second fluid force in a second mode of operation, said valve means permitting a volume of fluid to be communicated from the braking system to a relief chamber proportional to the input force to develop the second mode of operation, control means associated with the piston means for preventing fluid communication between the second mode of operation and the first mode of operation with a reduction in the input force until compensatory fluid is provided to the braking system for said volume of fluid communicated to the relief chamber, said control means comprising:
   a housing having a bore therein with a first diameter and a second diameter, said piston means dividing the first diameter into a first pressurizing chamber and said relief chamber, said piston means extending into said second diameter of said bore to form a second pressurizing chamber therein, said housing having a port means connected to a source of fluid to said first diameter of said bore, said piston means having a first axial bore therethrough with a first radial opening connected to the first pressurizing chamber and a second radial opening connected to the first pressurizing chamber and a second radial opening connected to the relief chamber, first valve means located in the first axial bore of said piston means between the first radial opening and the second radial opening for preventing communication between the first pressurizing chamber and the relief chamber while allowing communication between the first pressurizing chamber and the second pressurizing chamber in said first mode of operation and for interrupting the communication between the first pressurizing chamber and the second pressurizing chamber while allowing communication between the first pressurizing chamber and the relief chamber in said second mode of operation; and
   second valve means located in said first axial bore of the piston means between the first radial opening and the outlet to the second pressurizing chamber for allowing said first fluid force to be freely communicable between the first pressurizing chamber and the second pressurizing chamber in said first mode of operation and for preventing communication between the second pressurizing chamber and the first pressurizing chamber in the second mode of operation in response to a pressure differential being developed between the first fluid force and the second fluid force in the second mode of operation.

2. In the power braking system, as recited in claim 1, wherein said first valve means includes:
   tilt valve means responsive to said input force for regulating communication between the first pressurizing chamber and the relief chamber.

3. In the power braking system, as recited in claim 1 wherein said first valve means includes:
   cylindrical means having a second axial bore therein;
   poppet means located in said second axial bore; and
   first resilient means for urging said poppet means toward a seat to maintain a predetermined volume of fluid under pressure in the first pressurizing chamber in the second mode of operation.

4. In the power braking system, as recited in claim 3 wherein said first valve means further includes:
   projecting means extending from said cylindrical means for actuating said second valve means.

5. In the power braking system, as recited in claim 4, wherein said second valve means includes:
   first sleeve means located in said first axial bore having a seat on one end thereof for engaging said projection means upon movement of said first valve means to prevent communication between the first pressurizing chamber and the second pressurizing chamber in said second mode of operation.

6. In the power braking system, as recited in claim 5 wherein said second valve means further includes:
   stop means secured to said piston means; and
   second resilient means located between the stop means and said first sleeve means for urging the seat thereon toward the projection means to assure that the second pressurized chamber is sealed from the first pressurized chamber in the second mode of operation.

7. In the power braking system, as recited in claim 6 wherein said second valve means further includes:
   second sleeve means concentric to said first sleeve means having a rib thereon for engaging the first sleeve means; and
   third resilient means located between said second sleeve means and said projection means for urging said first sleeve means against said stop means in the first mode of operation.

8. In the power braking system, as recited in claim 7 wherein said projection means includes:
   disc means located between a shoulder on the end of the projection means, said seat on the first sleeve means engaging the disc means with initial movement of the first valve means to interrupt the communication between the first pressurizing chamber and the second pressurizing chamber, said tilt valve with further movement of the first valve means allowing said first fluid pressure to move said poppet means in opposition to said first resilient means and be released to said relief chamber to create a first pressure differential across said second sleeve means, said first pressure differential across said second sleeve means transmitting a reaction force through the first valve means to inform the operator of the intensity of the second fluid force.

9. In the power braking system, as recited in claim 8 wherein said control means further includes:

check valve means associated with said port means to prevent communication from the first diameter to the source of fluid, said first pressure differential moving the second sleeve means toward the first valve means with a reduction in the input force to develop a second pressure differential across said check valve means between the first pressurizing chamber and said source of fluid, said second pressure differential overcoming said check valve means to allow fluid to be communicated to the first pressurizing chamber until the second resilient means overcomes the first pressure differential to re-establish free communication between the first pressurizing chamber and the second pressurizing chamber.

10. In the power braking system, as recited in claim 9 wherein said piston means further includes:

a third radial opening connecting the second pressurizing chamber with the first pressurizing chamber to assure communication therebetween when the input force is terminated.

* * * * *